Sept. 22, 1964 F. C. BALDIK ET AL 3,150,237

TELEPHONE LINE CLEARING RELAY

Filed Feb. 21, 1961 2 Sheets-Sheet 1

Frank C. Baldik
Daniel Straszewski
INVENTORS

BY Clarence A. O'Brien
and Harvey B. Jacobson
Attorneys

Frank C. Baldik
Daniel Straszewski
INVENTORS

BY Clarence A. O'Brien
and Harvey B. Jacobson
Attorneys

United States Patent Office 3,150,237
Patented Sept. 22, 1964

3,150,237
TELEPHONE LINE CLEARING RELAY

Frank C. Baldik, 1312 4th Ave. E., and Daniel Straszewski, Rte. 1, River Road, both of Kalispell, Mont.

Filed Feb. 21, 1961, Ser. No. 90,817
9 Claims. (Cl. 179—81)

This invention relates to a line clearing system for use with telephone lines to which more than one telephone is operatively connected but enabling a single telephone to be operative at one time.

Under present telephone "party line" systems to which the present device applies, a problem is created when one telephone on the line becomes inoperative because of inadvertent uncradling of the telephone receiver from the cradle switch. When such a situation occurs, it is often required that all of the party line users of the telephone line be canvassed in order to isolate the faulty telephone in order to clear the line for the other users. The present invention therefore solves the aforementioned problem by providing a central switchboard signal that may be received by the uncradled telephone to not only provide a signal for the telephone subscriber that his telephone may be inadvertently uncradled but will also clear the line for the other telephone subscribers.

It is therefore a primary object of this invention to provide a relay device by means of which a centrally dispatched signal may restore operation to the telephone line to which a plurality of party lines are connected by opening the line to the telephone instrument which has been inadvertently uncradled.

Another object of this invention is to provide a line clearing relay device which not only signals the subscriber but also disconnects the faulty telephone from the line which may be readily restored to normal operation by replacement of the hand piece on the cradle switch.

An additional object of this invention is to provide a telephone line clearing relay device which includes a selectively actuated reset button through which the line clearing device may be reset for reception of a line clearing signal and also to render the telephone operative for normal operation.

The line clearing relay device of the present invention therefore includes a line clearing circuit which is connected between the telephone hook switch and the telephone line to the telephone instrument, which line clearing circuit is normally closed so that closing of the cradle switch for transmission of messages through the telephone line will not be normally disturbed. However, when the cradle switch of a particular telephone instrument is inadvertently uncradled, to thereby close the telephone circuit through the line clearing circuit, a centrally dispatched line clearing signal current of sufficient magnitude energizes a relay switch mechanism to open the line clearing circuit in order to restore operation to the telephone line for the other telephone subscribers. The relay switch mechanism is ordinarily held in inoperative position in which the line clearing circuit is held closed by a latch mechanism. When the relay switch mechanism is energized by the signal, however, to open the line clearing circuit, the latch is also released and is then effective to hold the relay switch mechanism in its circuit opening position after cessation of the line clearing signal. Thereafter, normal operation of the telephone may be restored by relatching of the latch mechanism either manually or by replacing the telephone hand piece on the cradle switch whereupon the relay switch mechanism will be restored to its inoperative position and relatched therein by the latch mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
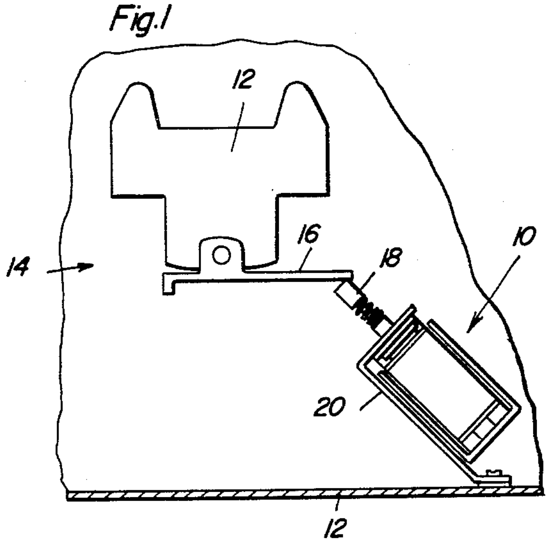
FIGURE 1 is a partial perspective view of the installation of the line clearing relay device within a telephone instrument.

Referring now to the drawings in detail, it will be observed from FIGURE 1 that the line clearing control device generally referred to by reference numeral 10 is mounted on the base 12 of a telephone subset for operative contact with the telephone hook switch lever and hand-piece cradle 14, of the telephone subset. When the telephone hand piece is cradled, the telephone switch lever 16 engages and depresses the push button actuator 18 of the control device 10 for conditioning the relay device 10 for reception of a line clearing signal and to condition the telephone receiving circuit for normal operation. The line clearing relay device 10 is accordingly mounted in operative relation to the cradle switch lever 16 by a mounting bracket 20.

Figure 9:
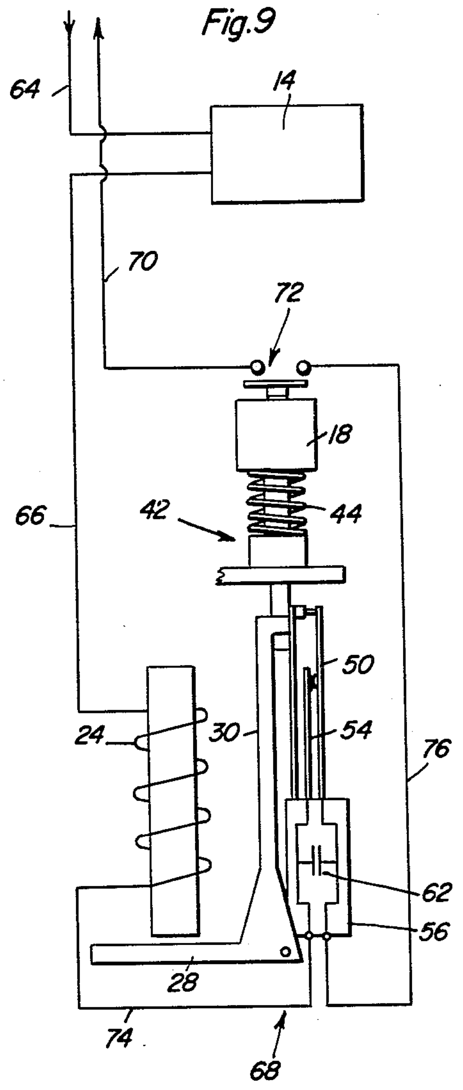
FIGURE 9 is a schematic circuit diagram of an operatively installed line clearing relay device.
Figure 2:
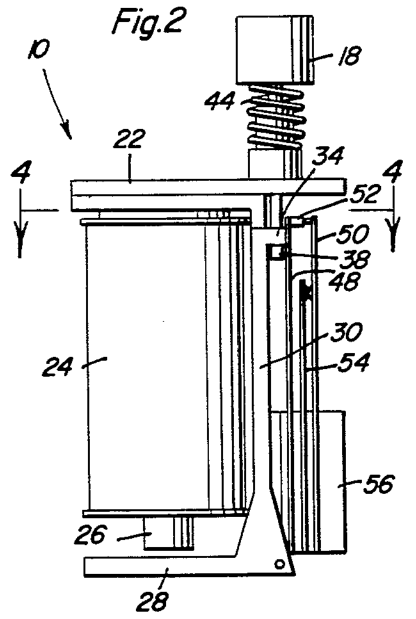
FIGURE 2 is a side elevational view of the line clearing relay device itself.
Figure 3:
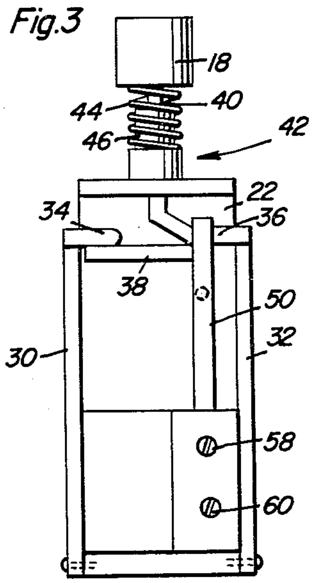
FIGURE 3 is a front view of the device illustrated in FIGURE 2.
Figure 4:
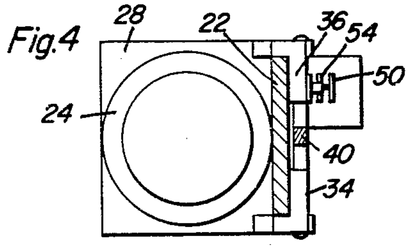
FIGURE 4 is a sectional view taken through a plane indicated by section line 4—4 in FIGURE 2.

Referring now to FIGURES 2, 3 and 4, it will be observed that the relay device 10 itself is mounted on a control frame 22 which mounts a control coil 24 within which the relay core 26 is mounted and projects below the bottom of the coil in operative relation to an armature portion 28. A pair of operating arms 30 and 32 are pivotally mounted by the frame and interconnected at the lower ends thereof by the armature portion 28. The operating arms 30 and 32 respectively have connected thereto at the upper ends, inwardly projecting tab formations 34 and 36 which cooperate with a latch formation 38 on the lower end of a latch slide member 40 to which the push button 18 is connected forming part of a reset latch mechanism 42. The slide member 40 is accordingly slidably mounted by the relay frame 22 and is urged upwardly from the position illustrated in FIGURES 2 and 3 by a spring element 44 which reacts between the shoulder on a tubular guide member 46 connected to the top of the relay frame 22 within which the slide member 40 is slidingly received and the bottom of the push button 18. The projecting end portion 36 of the operating arm member 32 is in contact with an operating leaf spring member 48 which may be displaced from its illustrated position in FIGURE 2 for displacing therewith the switch operating rod member 50 by the insulated push rod element 52. The switch rod 50 as illustrated in FIGURE 2 is in electrical contact with the fixed switch rod member 54 mounted in a switch block 56. Also mounted within the switch block 56 as schematically illustrated in FIGURE 9 is a time delaying capacitor 62 electrically connected across the terminals 58 and 60 of the switch rod members 50 and 54.

Figure 5:
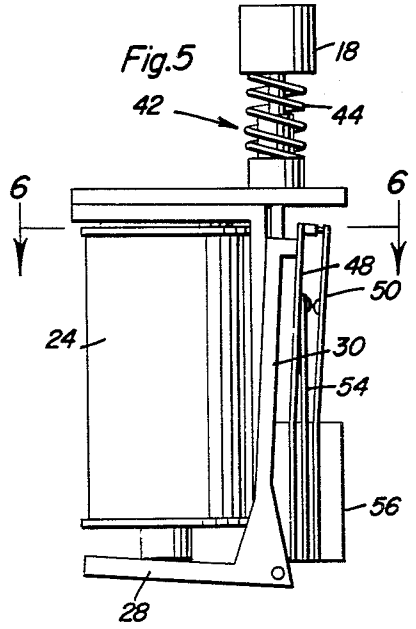
FIGURE 5 is a side elevational view similar to that of FIGURE 2 but illustrating the relay device in an operative line clearing position.
Figure 6:
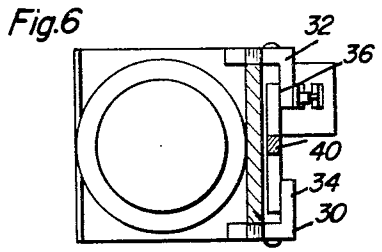
FIGURE 6 is a sectional view taken through a plane indicated by section line 6—6 in FIGURE 5.

Referring now to FIGURES 5 and 6, it will be observed that the electro-magnetic relay coil 24 has been energized so as to attract thereto the armature portion 28 causing pivotal displacement of the operating arms 30 and 32 to a circuit opening position causing the projecting tab portion 36 thereof to displace the operating spring member 48 and switch rod 50 so as to open the contacts between the switch rod 50 and switch rod member 54 to thereby open the circuit to which the terminals 58 and 60 of the switch box 56 are connected. It will also be observed that when the latch mechanism 42 has been released, the spring 44 thereof will upwardly bias the push button 18 to a released position. The relay mechanism is accordingly in an operative position when the latch mechanism 42 is in its unlatched position.

Figure 7:
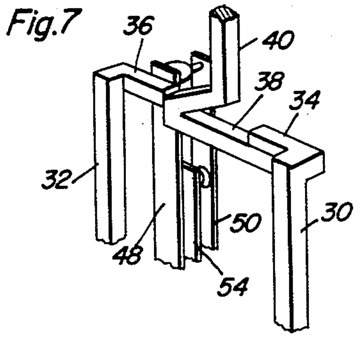
FIGURE 7 is a partial perspective view of the latch mechanism in an inoperative latched position corresponding to that of FIGURE 2.
Figure 8:
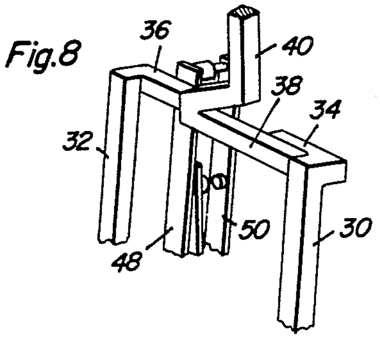
FIGURE 8 is a partial perspective view of the latch mechanism in an operative position corresponding to that of FIGURE 5.

Referring now to FIGURES 7 and 8, it will be observed that when the latch mechanism 42 is in its latched condition, the bar formation 38 at the lower end of the latch rod slide member 40 is engaged beneath the projecting tab 34 of the operating arm 30 which is then in its inoperative position as described with respect to FIGURE 2 to thereby hold the latch rod member 40 retracted against the bias of the spring element 44 urging the latch rod member 40 upwardly. When the relay coil 24 is energized to pivotally displace the operating arms 30 and 32 to a position relative to the latch mechanism as illustrated in FIGURE 8, the latch portion 38 and latch rod 40 will be biased upwardly to a position as illustrated in FIGURE 8 in which case the latch portion 38 is disposed rearwardly of the projecting tab 34 while the tab 36 has engaged the operating spring member 48 and the switch member 50 to open the switch and any circuit connected thereto. When the relay coil 24 is deenergized, return of the operating arms 30 and 32 to the deenergized position will be prevented by the latch formation 38 on the latch mechanism 42 which is then disposed behind the tab 34 as illustrated in FIGURE 8. Accordingly, the switch mechanism is held in its operative or open position, as described with respect to FIGURE 5. In order to reset and relatch the operating arms in their inoperative position, it will only be necessary to depress the button 18 connected to the latch rod member 40 in which case the latch formation 38 will move downwardly from the position illustrated in FIGURE 8 to permit the operating arms to return to their original position and be latched therein when the reset button 18 is released permitting the spring 44 to again upwardly bias the latch formation 38 against the underside of the projecting tabs 34.

From the foregoing description of the relay device construction, operation of the line clearing relay system of the present invention will become apparent. Referring therefore to FIGURE 9, it will be observed that the telephone instrument 14 through which messages are received and transmitted, is connected to telephone line 64 which in turn is connected by line 66 to a conditioned line clearing circuit generally referred to by reference numeral 68 which electrically interconnects the components of the relay device 10. The telephone return line 70 is connected to the line clearing circuit 68 through the telephone hook switch 72 so that the telephone circuit may be completed when the hand piece of the telephone is removed to close the telephone line switch device 72 in a manner well known to those skilled in the art. As will be apparent from FIGURE 9, normally the line clearing circuit 68 will provide a closed circuit when the hook switch 72 is closed upon removal of the hand piece inasmuch as the telephone line 66 is connected to the relay coil 24 which in turn is connected by conductor 74 to one terminal of the switch box 56 which as illustrated in FIGURE 9 is maintained closed with the contacts of the switch rod members 50 and 54 engaging each other. Accordingly, the conductor 76 is connected to the other terminal of the switch box 56 for completing a circuit through the hook switch 72 when closed to the return telephone line 70. It will also be observed that the capacitor 62 is connected across the terminals of the switch box 56.

Assuming therefore that the hook switch 72 is inadvertently closed because of accidental uncradling of the telephone handpiece, it will be apparent that the telephone circuit for the telephone instrument 14 will be closed unintentionally, preventing other telephone subscribers connected to the telephone lines 64 and 70 in common, from using their telephones. Under such conditions, a signal may be dispatched from the central switchboard station in the form of a higher current which is capable of ringing the telephone instrument 14 to call attention to the telephone subscriber if at home and also to energize the relay coil 24 which is connected in the circuit by virtue of the inadvertent closing of the hook switch 72. It will be apparent therefore, that the recess push button 18 although initially disposed in its latched position compressing the spring element 44, may upon release thereof, move upwardly to an unlatched position by virtue of the fact that the hook switch 72 is in closed position out of engagement with the push button 18. Energization of the relay coil 24 will therefore draw the armature portion 28 of the relay operating arm upwardly to pivot the relay operating arms in a clockwise direction was viewed in FIGURE 9 to open the contacts of the switch members 50 and 54. The line clearing circuit 68 would therefore be immediately opened were it not for the presence of the capacitor 62. The capacitor 62 will therefore provide a temporary time interval during which a sufficient holding current will flow through the line clearing circuit to maintain the operating arm in operative position as described with respect to FIGURE 5 so that the latch mechanism 42 may become unlatched to release the reset button 18. Upon cessation of the signal current, the operating arms of the relay mechanism will remain in operative position by virtue of the action of the latching mechanism as hereinbefore described. Accordingly, the telephone circuit for the telephone instrument 14 will be opened by virtue of the open condition of the line clearing circuit 68. The telephone line will then be available to the other subscribers. Restoration of normal telephone service to the telephone instrument 14 may be accomplished by subsequently replacing the hand-piece so as to open the line switch 72 and engage the push button 18 to restore the latch mechanism 42, in which case the operating arms of the relay mechanism will return to their inoperative position and be relatched therein. The line clearing circuit 68 will then once again close so that the telephone circuit will be restored to normal operation and the line clearing circuit 68 will again be conditioned for reception of a line clearing signal when needed.

From the foregoing description operation and utility of the line clearing device and system will be apparent. It will therefore be appreciated, that the present line clearing system in addition to bringing to the attention of the subscriber the uncradled condition of the telephone will also unlike previous line clearing systems actually disconnect the uncradled telephone from the line so that other subscribers may use their telephones. However, at any time desired, one may restore normal operation of the telephone which has been disconnected by the line clearing signal by merely engaging the reset button 18 to restore the line clearing circuit to its original closed condition. Accordingly, any accidental disconnection of one telephone by an erroneously dispatched line clearing signal during conversation may be immediately rectified under control of the subscriber.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A telephone line clearing system comprising in combination with a telephone receiving circuit having a handpiece actuated hook switch, normally closed line clearing circuit means operatively responsive through the hook switch to close the telephone receiving circuit, means instantaneously responsive to a line clearing signal to open the line clearing circuit means for the disconnecting of the telephone receiving circuit and delayed restoration thereof to a closed condition, latch means releasable by said hook switch for holding the line clearing circuit open prior to restoration to said closed condition and selectively actuated reset means rendered operative upon release of said latch means and following reception of said line clearing signal to restore the line clearing circuit means to a closed condition independently of the hook switch.

2. The combination of claim 1, wherein said signal responsive means includes relay means energized in response to a signal current in the line clearing circuit means to open the line clearing circuit means and delay means for maintaining said relay means energized for a delay period after cessation of said signal current to permit operation of said latch means.

3. The combination of claim 2, wherein said reset means includes selective actuator means operatively connected to a latch means for displacement thereof to a position restoring the line clearing circuit means to a closed condition after cessation of the signal and means for holding the latch means in said line restoring position independently of the hook switch.

4. The combination of claim 1, wherein said reset means includes selective actuator means operatively connected to the latch means for displacement thereof to a position restoring the line clearing circuit means to a closed condition after cessation of the signal and means for holding the latch means in said line restoring position independently of the hook switch.

5. The combination of claim 4 including time delay means in the line clearing circuit means to temporarily maintain the line clearing circuit means closed after reception of the line clearing signal so as to permit operation of the latch means.

6. The combination of claim 1, including time delay means in the line clearing circuit means to temporarily maintain the line clearing circuit means closed after reception of the line clearing signal so as to permit operation of the latch means.

7. In a telephone set having a switch hook and a message circuit, an auxiliary switching means comprising; a fixed support spaced from the switch hook, normally closed contacts on the support, signal responsive means movably mounted by the support to instantaneously open the contacts when displaced to a circuit opening position by a line clearing signal, latching means movably mounted on the support for displacement to a release position for holding the signal responsive means in said circuit opening position after reception of said line clearing signal, means on the signal responsive means preventing displacement of the latch means to said release position when the switch hook is closed in the absence of a line clearing signal, and means on the latch means engageable by the switch hook when open for disabling the latch means.

8. In a telephone set having a switch operating mechanism controlled by removal and replacement of the handset on its cradle and a receiving circuit, a normally closed auxiliary switch mounted on a deflectable arm, auxiliary switch opening means engageable with the auxiliary switch to deflect said arm, latch means for retaining the switch opening means in a position holding the auxiliary switch open only when the handset is removed from its cradle, auxiliary signal responsive means operatively connected to the switch opening means for movement thereof to said position in response to a line clearing signal when the handset is removed from its cradle and for delayed return of said switch opening means to an initial position such that the arm is returned to an undeflected position and means for disabling the latch means when the handset is replaced on its cradle.

9. In a line clearing system for use with a telephone subset having a hook switch closed upon removal of a handset from a cradle unit to close a message circuit, an auxiliary control unit comprising, support means fixedly mounted in the cradle unit in spaced relation to the hook switch, line clearing circuit means operatively connected to said message circuit for receiving a line clearing signal in a closed condition, means responsive to said signal for instantaneously opening said line clearing circuit means and restoring the line clearing circuit means to said closed condition after a delay period following cessation of the signal, latch means mounted by the support means in releasable engagement with the hook switch for movement to a circuit opening position during said delay period for holding the line clearing circuit means in an open condition, and reset means connected to the latch means for restoring the line clearing circuit means to said closed condition independently of the hook switch for selectively rendering the message circuit operative.

References Cited in the file of this patent

UNITED STATES PATENTS

| | | |
|---|---|---|
| 835,181 | Davidson | Nov. 6, 1906 |
| 1,145,632 | Ude | July 6, 1915 |
| 2,861,136 | Brison | Nov. 8, 1958 |